M. G. CHANDLER.
CARBURETER.
APPLICATION FILED DEC. 4, 1916.
1,370,949.
Patented Mar. 8, 1921.
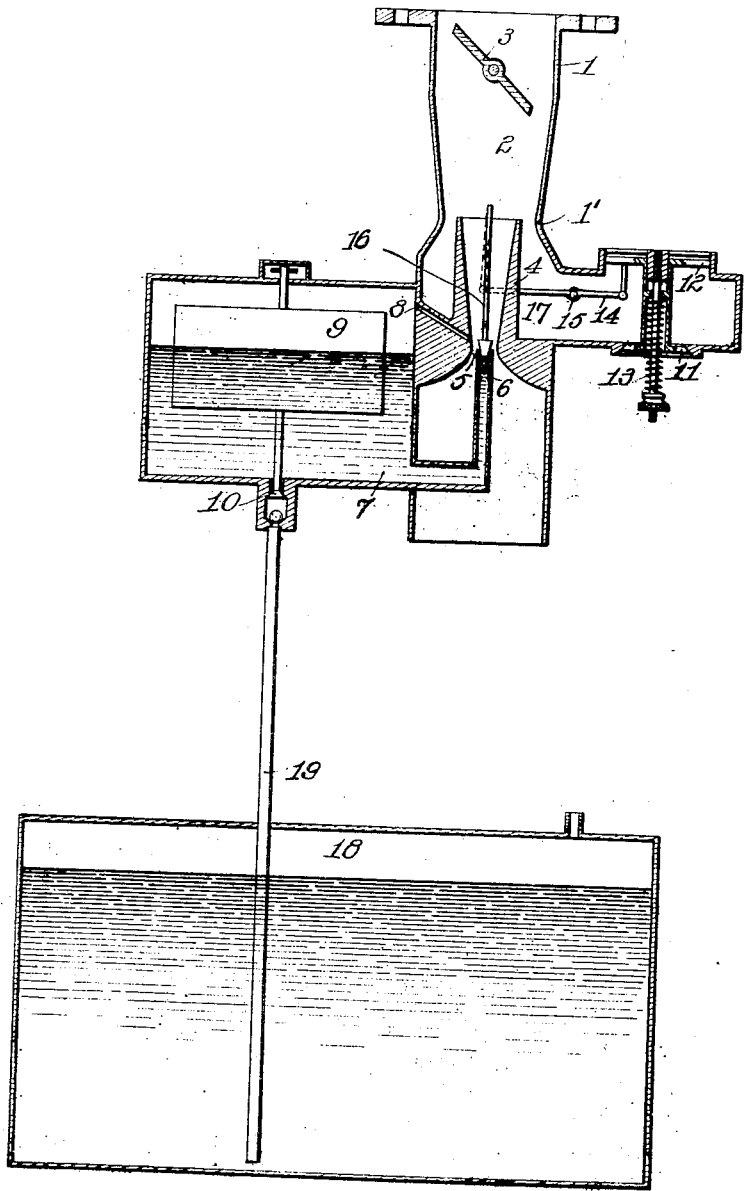

UNITED STATES PATENT OFFICE.

MILFORD G. CHANDLER, OF CHICAGO, ILLINOIS, ASSIGNOR, BY MESNE ASSIGNMENTS, TO LYNN A. WILLIAMS, OF EVANSTON, ILLINOIS, AND CURTIS B. CAMP, OF CHICAGO, ILLINOIS, TRUSTEES.

CARBURETER.

1,370,949.   Specification of Letters Patent.   Patented Mar. 8, 1921.

Application filed December 4, 1916. Serial No. 134,961.

*To all whom it may concern:*

Be it known that I, MILFORD G. CHANDLER, a citizen of the United States, residing at Chicago, in the county of Cook and State of Illinois, have invented a certain new and useful Improvement in Carbureters, of which the following is a full, clear, concise, and exact description, reference being had to the accompanying drawings, forming a part of this specification.

This invention relates to carbureters for internal combustion engines, my object being to provide a carbureter which will elevate its own fuel from a supply tank located at a lower level and at the same time supply the associated engine under all conditions with the requisite quantities of properly proportioned mixture of air and fuel.

An automobile engine must operate under widely varying conditions. The speed varies from the minimum at which the engine will barely maintain itself in rotation to the maximum at which its whole power is absorbed in overcoming internal losses. In many modern engines this means a speed range of from 100 revolutions per minute to 3000 revolutions per minute. At all but the limiting speeds the engine may be called upon to deliver zero (or even less than zero) power, (as when coasting down hill with clutch engaged) or any greater power up to the maximum of which the engine is capable. When the engine is running idle, that is, under no load, the speed depends upon the degree to which the throttle is opened or closed. At every position of the throttle, however, the load may be increased from nothing to a point at which the engine speed will be reduced until the engine is brought to a complete standstill. In the running of an automobile the power which the engine is required to develop at any speed will depend upon the condition of the road,—whether smooth, muddy, or sandy, and upon the grade,—whether level up hill or down hill. As the speed of the car varies, the power requirements of the engine will vary depending upon whether the speed of the car is accelerated or decelerated.

To illustrate by a concrete example: An automobile is standing idle at a level street curb, with engine not running. In starting the engine, the throttle will ordinarily be opened about one fourth, and the engine cranked. When ignition occurs, the engine will run under its own power and at a high speed, until the operator almost completely closes the throttle, it being left open only sufficiently to keep the engine in motion at a low speed of say 200 revolutions per minute. The clutch is then disengaged and the transmission gear set thrown into "low gear." The clutch is then engaged and simultaneously the throttle is opened, with the result that the car starts from rest and rapidly accelerates in speed until the engine is running at a high speed. The throttle is then suddenly returned to an almost completely closed position while simultaneously the clutch is disengaged and the transmission gear set is shifted to "second" speed. The clutch is then immediately reëngaged and the throttle again opened, while the car accelerates to a speed suitable for "high gear" driving, when again the same sequence is repeated.

The car having been brought into "high" gear at say twenty-five miles per hour, the engine will be running at about 1000 revolutions per minute, with the throttle not more than one-fourth open. If now the car encounters a sandy stretch of road or a steep up grade, it will be necessary to increase the throttle opening in order for the car to maintain this same speed of twenty-five miles per hour. So also upon a very steep hill or upon a very soft road it may be necessary to open the throttle wide in order that the engine may develop enough power to maintain the car in motion at twenty-five miles per hour, and indeed it not infrequently happens that even a wide open throttle will not maintain this car speed, whereupon the car gradually loses speed until it is moving at say only six miles per hour. In that event the operator will suddenly shift from "high" gear to "second" gear, whereupon the engine speed increases to a point where the car will be continued in motion and in all likelihood accelerated in speed.

The automobile having reached the crest of the hill begins the descent on the other side. It is the part of good driving in this case to maintain the engagement of the clutch but almost completely to close the engine throttle, gravity acting as the power for moving the car; and the engine being driven by the rear wheels of the automobile.

When the engine is thus driven by the automobile at a considerable speed, it acts as a brake to check the otherwise too rapid descent of the car, and although under such conditions a small quantity of combustible mixture is admitted to the engine cylinders and is there ignited in the usual way, still the relation of the engine to the automobile becomes that of a suction pump whose driving power is supplied by the car, and which pump is drawing in air through a passage very much constricted by the almost completely closed throttle.

Under these widely different but not at all unusual conditions of automobile operation, the condition of pressure reduction,—or, more conveniently, the degree of suction in the pipe or manifold leading from the throttle to the engine valves and cylinders, will vary widely. In a modern automobile and engine equipped with a good carbureter of conventional type, this suction on the engine side of the throttle expressed in inches of gasolene in a manometer tube, will vary from a minimum of four to eighteen inches low speed at full load to a maximum of about 350 inches at no load.

Thus in the concrete example above set forth, when the engine is first cranked and fired, the suction in the manifold will be low until the initial impulses in the engine cylinders bring the engine rapidly to an idling (or no load) speed of say 1500 revolutions per minute, when the suction in the manifold will be in excess of 300 inches of gasolene. Upon the closing of the throttle to effect an idling (or no load) speed of 200 revolutions per minute, the suction of the engine manifold will continue in excess of 300 inches and may in fact slightly exceed what it was when the engine idled at 1500 revolutions per minute. When the engine has been connected in "low" gear and the clutch let in, and the throttle opened wide to start, and accelerate the car, the suction in the engine manifold will first drop suddenly to say ten inches of gasolene and then increase gradually as the engine accelerates under the full load of the correspondingly accelerated car. This sudden drop and gradual increase in the manifold suction will be repeated with each gear shift until the car is running 25 miles per hour on the smooth level road, under which partial load condition the manifold suction may be in the neighborhood of 200 inches of gasolene.

When a hill or soft road is encountered, the throttle will be opened to maintain the desired speed of 25 miles per hour, thus fully loading the engine whereupon the suction in the manifold will drop to, say 30 inches of gasolene. If now the maximum power of the engine at this speed is not sufficient to maintain the car in motion at that speed, the engine and car will slow down in accordance with our example to six miles per hour, the throttle still being held wide open in order that the engine may develop its maximum power. As the engine is thus slowed down from say 1000 revolutions per minute to 240 revolutions per minute, but with continued wide open throttle, the volume of gas drawn in by the engine cylinders will be correspondingly reduced and the correspondingly reduced velocity of the gas passing through the manifold will reduce the suction in the manifold from thirty inches, as assumed, to say, ten or fifteen inches. When the car passes over the hill crest and is using the engine to brake its descent down a steep grade, the rapid movement of the engine pistons at a time when the throttle is practically closed will, under this negative load condition, run the manifold suction up to 350 inches of gasolene.

It has become customary to locate the carbureter on a level near the top of the engine and to mount the main gasolene supply tank at a lower level, at the rear of the automobile, the difference in level sometimes amounting to as much as thirty-six inches, on steep up grades. Obviously some means must be and is provided to elevate the fuel from the low level main tank to the float chamber or nozzle of the carbureter. Pressure and force pumps for this purpose have now been largely superseded by gasolene elevating mechanisms depending for their operation upon the suction developed in the engine manifold, as previously explained. Commercial usage has turned largely to an auxiliary tank located above the level of the carbureter and from which auxiliary tank the fuel flows by gravity into the float chamber of the carbureter. This auxiliary tank is connected with the engine manifold, whereby the suction in the manifold is communicated to the auxiliary tank, whereby fuel is drawn through a pipe from the low hung main gasolene tank into the auxiliary tank. While such an arrangement does not disturb the necessary construction or normal functioning of the usual carbureter, it involves considerable expense for intallation and maintenance, and is subject to the further objection that when the associated engine is operated for any considerable time with wide open throttle, the manifold suction may not be sufficient to raise fresh gasolene from the main tank to the auxiliary tank, in which event the exhaustion of the accumulated supply of fuel in the auxiliary tank will bring the engine to a stop for lack of fuel. When such auxiliary tanks are employed, they have no part in regulating the mixture of air and fuel delivered to the engine, nor in controlling the quantity or rate of fuel delivery. All that is attempted with them is to provide a supply of gasolene which will flow by gravity into the float chamber of the carbureter to replenish the fuel which the carbureter draws from its own float chamber, and the regulation of which demand is controlled by the carbureter. While in the use of such auxiliary tanks it is an almost momentary occurrence that the suction in the engine manifold will not be sufficient to elevate gasolene to the level of the auxiliary tank, still the storage capacity of the auxiliary tank is made sufficient to tide over all but the most protracted of these low suction intervals, it being recognized, of course, that the gasolene level in the float chamber of the carbureter cannot be permitted to drop even for a moment without causing the engine to miss firing and stop.

Some inventors have sought to obviate the use of such auxiliary tank mechanisms by utilizing the engine suction as developed in the manifold, or some part of the induction passage leading to it, to elevate gasolene directly from the low level main tank to the carbureter. Those who have had any degree of success have recognized the fact that a properly regulated supply of fuel must be constantly available at the spray nozzle of the carbureter from which, in the running of a multi-cylinder engine, there must be an uninterrupted flow, properly admixed with air, to the engine manifold and cylinders. But these inventors have by the terms of the very problem which they have set themselves, been unable to "tide over" the periods of low suction in the engine manifold or induction passage. And since there can be no interruption in the flow of gasolene from the spray nozzle of the carbureter; since, in other words, gasolene must be elevated to the float chamber or nozzle of the carbureter just as uninterruptedly as it must flow from the nozzle, these inventors have resorted to one expedient or another for preventing the suction in the manifold or induction passage from dropping, at any time or under any conditions, to a point so low as to be inadequate to elevate gasolene from the low level main tank to the carbureter. Thus these inventors have in one way or another increased the restriction with which air is permitted to flow into the carbureter, and thence through the remainder of the induction passageway to the engine cylinders. Such increased restriction has, to be sure, prevented the suction in the induction passage from dropping so low that it would no longer be sufficient to elevate the fuel; but the restriction has necessarily acted like a partial throttle, always applied and serving to limit the flow of gas to the engine cylinders whenever the main throttle is widely opened. With such devices, therefore, it has been impossible for the engine at any speed to pull so large a load as it would otherwise be capable of.

I can illustrate this difficulty and objection by reference to U. S. Letters Patent No. 1,173,378, to A. L. Payton. Payton develops a fuel lifting suction in the upper part of his float chamber by connecting it with the induction passage leading to the engine cylinders. Now in order that this suction in the float chamber may at all times be sufficient for the purpose, it is necessary that at least the same degree of suction be maintained at all times in the induction passage with which the float chamber is connected. This necessary degree of suction in the induction passage is secured by restricting the primary air intake passage by a spring controlled valve (46 of Fig. 2), and by increasing the restriction of the secondary air intake passage by increasing the initial compression of the secondary valve spring (50 of Fig. 2) over what it would be if the float chamber were supplied with fuel by gravity or pressure flow. (See lines 90 to 95 of page 2 of Payton patent.) The result is that even though Payton's throttle be opened wide at any engine speed, the quantity of gas passing to the engine cylinders will not be so great as though the restricting intake valves of the carbureters were pressed toward their seats with a less degree of spring force, or if indeed the primary air inlet valve were omitted entirely.

It is the primary object of my invention to utilize the suction existing in the induction passage leading to the cylinders of a variable speed internal combustion engine to develop under all conditions a sufficient suction for lifting fuel to the carbureter from a low level supply without restricting the flow of air in the induction passages in such manner as materially to detract from the power of the engine while providing at the same time for a properly proportioned mixture of air and fuel under all conditions of operation.

All commercially useful carbureters of which I am aware provide some slight restriction upon the air passing into and through the carbureter in order to effect the delivery of liquid fuel from the spray nozzle or its equivalent, and in order that the proper proportions of air and fuel may be automatically secured under various conditions of operation. This restriction inevitably causes some suction to be established and maintained in the mixing chamber or other passages of the carbureter. I achieve the primary object of my invention by subjecting the outlet orifice of a small Venturi tube to the suction thus existing in the induction passage of the carbureter, whereby a suction is developed at and near the throat of this small Venturi tube, which is greater than the suction in the part of the induction passageway into which this small Venturi tube discharges. In a way this small Venturi tube may be said to multiply or augment the otherwise available suction. And it is this augmented suction developed at or near the throat of the small Venturi tube which I use in elevating the fuel to the carbureter of which it forms a part. Preferably the orifice of this small Venturi tube will discharge at or near the throat of a large Venturi tube through which the bulk of the air or gas supply to the engine flows. Desirably also for various reasons my carbureter will be provided with a fuel float chamber to the upper spaces of which the augmented suction of the small Venturi tube will be communicated to elevate the fuel to the float chamber preliminary to its delivery to and through the fuel spray nozzle.

In accordance with my invention these features must be so organized that the delivery orifice of the spray nozzle or its equivalent will always be subjected to a greater suction than that in the float chamber,—in order to insure a flow of fuel to be mixed with the air passing to the engine cylinders, and furthermore, this differential of suction, upon which the fuel feed depends, must be so related to the other parts and functions of the carbureter that the proper proportions of fuel and air will be maintained under the varying conditions and demands previously alluded to. This necessary differential of suction had best be maintained without permitting the float chamber suction to increase very much above the predetermined minimum which will insure the elevation of the fuel from the low level main tank, for if the float chamber suction should be permitted to increase considerably it will be necessary for the suction on the spray nozzle outlet orifice to rise to a still higher degree in order that fuel may be drawn from the float chamber, and this in turn means increased suction in the induction passages of the carbureter with corresponding loss of engine power. In other words, it is desirable to maintain continuously a substantially constant degree of fuel-lifting suction derived from the widely varying suction in the engine manifold. This relatively constant fuel-lifting suction will be greater than the minimum suction in the engine manifold, or in the mixing chamber of the carbureter, and sufficient at all times to raise fuel from the low level supply tank to the carbureter appurtenant to the engine.

With the carbureter of my invention a fuel lifting suction equivalent to at least thirty-six inches of gasolene is continuously maintained under all conditions, even though the engine suction from which the fuel lifting suction is derived, remains for long periods as low as the equivalent of eighteen inches of gasolene. By the use of my invention more power may be obtained from an engine than could be obtained if the mixing chamber suction, and hence the manifold suction, were maintained adequate at all times for directly lifting the fuel, as in prior devices, such, for example, as Payton's.

In the accompanying drawing I have more or less diagrammatically illustrated the most preferred form of my invention, of which I am aware.

This illustrated embodiment of my invention comprises a body portion 1 forming the mixing chamber 2 and provided with the usual form of posterior butterfly throttle 3, located between the mixing chamber and the intake manifold of the engine (not shown). The entrance to the mixing chamber 2 is preferably venturi shaped having a throat 1' for the purpose hereinafter described.

A primary Venturi tube 4 extends from the external atmosphere to the throat 1' of the large Venturi tube. The walls of the Venturi tube 4 converge to the throat 5 and then diverge at an angle of about 7 degrees toward the discharge end. The fuel port or nozzle 6 is located a few thousandths of an inch posterior to the throat of the Venturi tube 4 and is connected for fuel supply with the lower part of the float-controlled fuel chamber 7. The upper part of the float chamber is air tight except for a small duct 8 which extends through the wall of the Venturi tube 4 opening into about $\frac{1}{16}$ of an inch posterior to the throat. The float chamber is provided with a float 9 controlling a valve 10 which prevents the height of the fuel exceeding a predetermined level. The throat of the Venturi tube 4 is very small and in fact is only of such size as to admit approximately all of the air necessary for running the engine at its lowest idling speed. Under this condition the outlet orifice of the Venturi tube 4 is subjected to the degree of suction developed at the throat of the mixing chamber when the throttle 3 is almost completely closed for idling and when the power of the engine is sufficient only for overcoming its own internal losses at its lowest running speed. A secondary air valve 11, controlled by a piston 12 and a spring 13, admits additional air in a by-pass of the primary tube 4 for operating the motor at higher engine speeds and under greater power demands. The piston 12 has a greater area than that of the valve 11, so that when the suction in the space 17 between the valve 11 and the piston 12 reaches a predetermined value sufficient for overcoming the normal tension of the spring 13, the valve 11 will be moved off its seat. The incoming air relieves the suction on the inside face of the valve 11 to a greater extent than it is relieved on the plunger 12, and to that extent the valve is made stronger in its tendency to open, which action balances the increasing tension of the spring 13. This compensating or balancing action of the valve causes it to open to a large degree upon a very small increase in the suction in the mixing chamber 17, and results in maintaining a suction or pressure reduction in the chamber 17, which is relatively constant as compared with the widely varying suction in the manifold on the engine side of the throttle. While it is true, as above stated, that the mixing chamber suction must increase slightly in order to move the valve 11 to a further open position, still the proportion of the parts is such that a positive action of the automatic air valve 11 will be secured with a very small increase in suction. The action of the valve 11 is such as to maintain the suction within the entire induction passage including the chamber 17, the mixing chamber 2, and even the throat of the large Venturi tube 1' relatively constant as compared with the widely variable suction on the engine side of the throttle 3. An arm 14 pivoted at 15 controls the fuel metering pin 16, which is so shaped as to provide the right size fuel port to create a proper fuel and air mixture for all positions of the secondary air valve 11. A low level supply tank 18, usually located at the rear of an automobile, is connected for fuel delivery to the float chamber of the carbureter by means of a pipe 19.

The combination of parts just described is such as to maintain a relatively constant suction or pressure reduction of about 36 to 42 inches of gasolene in the upper spaces of the float chamber notwithstanding the fact that the suction in the engine manifold varies from eighteen to three hundred and fifty inches of gasolene. I would still consider the float chamber suction to be relatively constant though it varied through a somewhat wider range than above mentioned, when compared with the wide variation of the suction in the intake manifold of the engine.

In the operation of my invention, starting with the idling condition of the engine, that is, with the throttle 3 substantially closed, all of the incoming air passes through the throat of the small Venturi tube 4, except that which leaks around the valve 11 and the piston 12. Under these conditions, the suction on the piston 12 is sufficient only to make the valve 11 rest lightly on its seat but is not sufficient to open the valve. In this idling condition of the engine a suction equivalent to about 18 inches of gasolene is produced in the mixing chamber 2 and at the discharge orifice of the Venturi tube 4 and in the space 17. With this suction of 18 inches of gasolene in the mixing chamber 2, the action of the Venturi tube 4 is such as to produce a suction equivalent to 36 inches of gasolene at the Venturi end of the duct 8, and consequently in the upper part of the float chamber 7. Since in the present form of my invention a single small Venturi tube is employed both for augmenting the suction for elevating fuel to the float chamber and for augmenting the suction for drawing fuel from the fuel feeding nozzle, the fuel port 6 is located at the point of highest suction and the passage 8 is located at a point of slightly less suction, in the Venturi tube 4, a sufficient suction differential being thus maintained between the surface of the fuel in the float chamber and the fuel port 6 to deliver fuel from the latter for mixture with the air passing through the Venturi tube 4 in the proper proportion to produce a correct explosive mixture. When the throttle 3 is opened, for example, to the position shown in the drawing, there is a tendency to increase the suction in the mixing chamber 2, but even in this position the throttle 3 constitutes a restriction between the mixing chamber 2 and the engine intake which prevents the suction in the mixing chamber 2 equalizing with that of the engine intake. Furthermore, the slightly increased suction in the mixing chamber 2 is immediately communicated by way of chamber 17 to the under side of the piston 12, causing the immediate opening of the valve 11 to a position wherein a balance between the pressure of the spring 13 and the suction on the piston 12, is reached, the opening of this valve serving to prevent anything more than a slight increase in the suction in the chambers 17 and 2. The movement of the piston 12 causes a proportionate opening of the fuel port 6, and consequently causes an increase in the flow of fuel from the fuel port. In tests of this carbureter, with the throttle opened to a position about like that illustrated in the drawings, a suction equivalent to 26 inches of gasolene was produced in the mixing chamber 2, a suction equivalent to 19 inches of gasolene was produced in the space 17 (the suction in 2 being greater than that in 17 because of the interposed constriction of the Venturi tube 1'), and a suction equivalent to 34 inches of gasolene was produced at the discharge end of the small Venturi tube 4 through the action of the large Venturi tube 1'. It might appear that this increased suction of 16 inches of gasolene (over what was obtained under idling conditions) at the discharge end of the Venturi tube 4, would cause an increased suction at the throat 5 of this Venturi tube which is even greater than the 16 inch change in suction at its discharge end; but this is not the case. The fact is that the increase in flow of gasolene through the small Venturi tube 4 prevents any material change in suction at its throat 5, although the suction at its discharge end has been, as just stated, very materially increased. In other words, this increase in flow of gasolene through the small Venturi tube 4, due mainly to the enlargement of the fuel orifice, so affects what I term the pressure reduction efficiency of this small Venturi tube, that the suction at the Venturi end of the duct 8 is not materially changed. In the tests mentioned the suction on the duct 8, and consequently in the top of the float chamber 7, increased only the equivalent of two inches of gasolene with an increase of sixteen inches in the suction at the discharge end of the tube 4.

The necessarily increased flow of gasolene will occur under these conditions because of the enlarged opening of the nozzle through which gasolene is delivered into the Venturi tube 4, it being remembered that the slightly increased suction at the outlet of the Venturi tube 4 will have acted also upon the piston 12 of the valve 11, the resulting movement of this piston causing the tapered metering pin 16 to be withdrawn somewhat from the end of the nozzle 6 to enlarge the discharge opening therefrom and thus to increase the rate of gasolene delivery despite the very slight, or possibly even negligible, increase in the suction upon the outlet end of the nozzle 6. The degree of taper of the metering pin 16 is adjusted in the usual way to permit the proper rate of gasolene flow at every position, and thus to insure a correctly proportioned mixture of air and fuel.

When the throttle 3 is wide open the engine suction, as exhibited in the manifold on the engine side of the throttle, and that in the mixing chamber 2, become substantially equal, and the quantity of air drawn into the carbureter then depends upon the engine speed. The higher the speed the greater the quantity of air drawn in and consequently the greater the suction in the mixing chamber 2. When the engine load is such as to hold the speed down to 400 revolutions per minute with wide open throttle, the mixing chamber suction is equivalent to about twenty inches of gasolene, but when the speed reaches 1,800 revolutions per minute, the mixing chamber suction ascends to the equivalent of about thirty inches of gasolene. Again under these two different conditions, the suction in the top of the float chamber changes only from about thirty-seven to about forty-two inches of gasolene and the actual flow of air through the Venturi tube 4 increases only in about this same proportion due to the quantity of gasolene that is then passing through it.

It is under the high speed wide open throttle operation that the large Venturi tube 1' is of greatest importance. Under these high speed conditions a large quantity of air enters the mixing chamber through the valve 11, around the Venturi tube 4. This inrushing air, by reason of the Venturi shape of the casing 1', creates the necessary high suction on the posterior end of the Venturi tube 4, without the suction in the mixing chamber 2 increasing nearly to this same extent. That is, the action of the large Venturi tube 1' as the air rushes through it and past the posterior end of the small Venturi tube 4 located at the throat of the large tube 1', is to produce a strong suction at the mouth of the small tube 4 which does not extend to the mixing chamber 2 or to the manifold of the engine. This is important, because as previously stated, it is a high suction in the mixing chamber of a carbureter and in the engine manifold that causes an engine to lose power. The carbureter would function with plain parallel walls instead of the Venturi tube 1', but in that case, in order to produce a sufficient degree of suction in the float chamber, the suction in the mixing chamber 2 would have to be increased to about that suction necessary at the posterior end of the small Venturi tube 4, but as previously explained, by increasing the suction in the mixing chamber 2, the power developed by the engine would be reduced. A straight tube would have its suction substantially uniformly distributed throughout its length whereas the Venturi tube 1' localizes the highest suction to the region of the mouth of the small Venturi tube 4.

My structure may be somewhat modified without materially altering the principle of operation and without departing from the spirit and scope of my invention.

Throughout this description and in the claims I have used the word "suction" synonymously with "pressure reduction" and have designatel its measurement in terms of the height of a vertical column of gasolene which could be raised in a tube the lower end of which extends into gasolene open to atmospheric pressure and the upper end of which is connected to receive the suction found in the part under consideration.

In the appended claims when I state that the float chamber or fuel reservoir is closed to the atmosphere, I mean that it is "effectively" or "in effect" closed to the atmosphere to the end that my fuel lifting carbureter may function as herein set forth.

In the appended claims the words "relatively constant" have been used to designate the relation between the suction in the intake manifold on the engine side of the throttle, which varies throughout a great range, and the suctions in the float chamber and mixing chamber of the carbureter, which vary only through a slight range, and the words "substantially constant" as applied to the suction in the float chamber and mixing chamber of the carbureter may likewise be considered as comparing the suction in these parts with the widely variable suction in the intake manifold.

Having thus described my invention, what I claim is:

1. In a fuel lifting carbureter for variable speed engines, a casing forming an air induction passage, means to maintain a suction in said passage relatively constant as compared with and throughout widely varying engine suction, a Venturi tube extending into said passage and having its inner end subjected to the suction therein, a fuel chamber effectively closed to atmosphere, a tube extending from the upper part of said fuel chamber to a restricted part of said Venturi tube, and means to deliver fuel from the lower part of said fuel chamber into said induction passage.

2. A fuel lifting carbureter having a variably restricted secondary air intake, a small Venturi tube constituting a primary air intake, a fuel reservoir effectively closed to atmosphere, a fuel port terminating in said Venturi tube at a point of high suction therein, and means dependent upon the suction in the intake passage for maintaining in the top of the fuel reservoir a suction less than that at the fuel port but which is greater than that maintained in the intake passage.

3. A combined carbureting and fuel lifting device for variable speed engines comprising in combination, a casing forming an air induction passage, a Venturi tube extending into said induction passage and constituting a primary air inlet, a constant level fuel reservoir effectively closed to atmosphere disposed adjacent to said induction passage, a fuel supply nozzle connected with said constant level reservoir and terminating in said Venturi tube, a secondary air inlet for said induction passage, an automatic valve variably restricting the secondary air inlet and adapted to maintain a substantially constant suction in the induction passage, a metering pin controlling said fuel nozzle, means connecting the said automatic valve and metering pin whereby the fuel nozzle orifice is variably restricted by said metering pin, a low level supply tank, a conduit directly connecting the constant level fuel reservoir with the low level supply tank, and a passageway connected at one end with the fuel reservoir above the level of fuel therein and subjected at the other end to the aspirating action of air restrictedly entering the induction passage to maintain a suction in the said constant level fuel reservoir sufficient to lift fuel from said low level supply tank.

4. In a combined carbureting and fuel lifting device, the combination of a mixing chamber, a float chamber, a fuel port directly connected with said float chamber and adapted to deliver fuel therefrom, through an air tight passage to said mixing chamber, a low level supply, a pipe leading directly from the low level supply to said float chamber for delivery of fuel thereto solely by suction, a Venturi tube extending into said mixing chamber and provided with a connection extending from a point near its throat to the top of said float chamber to produce a greater suction on the fuel in the float chamber for lifting fuel thereto than exists in the mixing chamber, and a float in the said float chamber to limit the level of fuel therein.

5. In a device for lifting fuel from a low level source to supply a carbureter, the combination with a fuel reservoir constantly effectively closed to atmospheric communication, a mixing chamber, means for delivering fuel from said reservoir to said mixing chamber a Venturi tube extending into said mixing chamber from the external atmosphere, a duct extending from a restricted part of said Venturi tube to the top of said fuel reservoir, the opening through said Venturi tube being so small that for the lowest engine demand the Venturi tube creates such an air restriction that the suction in the mixing chamber is great enough to create a suction at the Venturi end of said duct sufficient for lifting fuel to said reservoir, and other means for admitting air to said mixing chamber.

6. In a fuel lifting carbureter a Venturi tube constituting a primary air intake, a fuel reservoir effectively closed to atmosphere, a fuel port in said Venturi tube at a point of high suction therein, a duct extending from a point of slightly less suction in the said Venturi tube to the upper part of said fuel reservoir, and automatic means for modulating the depression to which the outlet orifice of said Venturi tube is subjected.

7. In a carbureter for internal combustion engines, the combination with a casing forming a mixing chamber, of a supply reservoir below the level of the carbureter, means for variably admitting air to the carbureter in quantities so restricted as to provide a mixing chamber suction less than that required to lift the fuel from the low level reservoir to the carbureter, and means dependent, upon the suction in the mixing chamber for developing continuously a fuel lifting suction sufficient for lifting the fuel from the low level reservoir to the carbureter.

8. In a combined carbureting and fuel lifting device, the combination of an air induction passage attachable to the intake manifold of an internal combustion engine, a liquid fuel supply reservoir below the level of the carbureting means, a liquid fuel passageway leading from the low level reservoir and conveying fuel to said induction passage, and means including an aspirating passage through which air is supplied to said induction passage, to develop from the widely varying suction in the engine manifold, a relatively constant suction, which suction is communicated to the interior of said fuel conveying passageway and which suction is greater than the minimum suction existing in the manifold and at all times sufficient to lift liquid fuel from the supply reservoir through said fuel conveying passageway to the carbureting means.

9. In a combined carbureting and fuel lifting device for variable speed engines comprising the combination of a casing forming an air induction passage, a Venturi tube extending into said induction passage and constituting a primary air inlet, a constant level fuel reservoir effectively closed to atmosphere disposed adjacent said induction passage, a fuel supply nozzle connected with said constant level reservoir and terminating in said Venturi tube, a secondary air inlet for said induction passage, an automatic valve variably restricting the secondary air inlet adapted to maintain a relatively constant suction in the induction passage, a low level supply tank, a conduit directly connecting the constant level fuel reservoir with the low level supply tank and a duct subjected to the aspirating action of air restrictedly entering the induction passage to maintain a suction in said constant level fuel reservoir sufficient to lift fuel from said low level supply tank.

10. In a carbureting and fuel lifting device for variable speed internal combustion engines, an induction passage including a mixing chamber, said induction passage having a restriction at which is developed a suction greater than that of the mixing chamber, a Venturi tube discharging into the induction passage at the place of restriction therein, a fuel reservoir effectively closed to atmosphere, means for conveying fuel from said reservoir to said mixing chamber, a fuel elevating suction connection between the restricted portion of said Venturi tube and said reservoir, and a fuel conduit leading from a low level supply to said reservoir.

11. In combination a carbureter having an induction passage through which flows the bulk of the air supplied to an associated engine, means for delivering fuel to said induction passage, a suction augmenting tube opening and discharging a minor quantity of air into said induction passage, a low level fuel supply tank, a supply pipe leading from said tank to said carbureter, and a connection from a high suction part of said suction augmenting tube to said supply pipe whereby upon the running of the engine fuel is elevated by suction from said tank to the carbureter.

12. In a carbureter adapted for application to an internal combustion engine the combination of a Venturi tube constituting a primary air intake, a fuel reservoir effectively closed to atmosphere, a duct extending from a point of high suction in said Venturi tube to the upper part of said fuel reservoir, a fuel duct leading from the lower part of the fuel reservoir and means for maintaining a suction upon said fuel duct sufficient to draw fuel through said duct for delivery to the mixing chamber, a throttle for regulating the opening from the carbureter to the associated engine and a variably restricted secondary air intake.

13. In combination with an internal combustion engine having an explosive mixture induction passage, some part of which is maintained at less than atmospheric pressure by means of engine suction, two air intake ports for said passage, one port being in the form of a small Venturi tube having one end terminating at and discharging into the said part of said induction passage the other end of said Venturi tube being exposed to a higher pressure, the other port being arranged to admit air to said passage through a separate path, a low level fuel supply tank, a higher level fuel receptacle, a conduit between said receptacle and the region of enhanced suction in said Venturi tube for creating a suction in said receptacle for lifting fuel thereto from said low level supply tank.

14. In a combined carbureting and fuel lifting device, the combination of an air induction passage, attachable to the intake manifold of an internal combustion engine, a liquid fuel supply reservoir below the level of the carbureting means, a fuel passageway leading from the low level reservoir and conveying fuel to said induction passage, means including a variably restricted air inlet and an aspirating passage through which air is supplied to said induction passage coacting to develop from the widely varying suction existing in the engine manifold a relatively constant fuel lifting suction which is greater than the minimum suction existing in the manifold and which is applied to the fuel in said fuel conveying passage and which is at all times sufficient to lift liquid fuel from the supply reservoir through said fuel conveying passage to the carbureting means.

In witness whereof, I hereunto subscribe my name this 1st day of December, A. D. 1916.

MILFORD G. CHANDLER.

Witnesses:
A. G. McCaleb,
Chas. Pimbley.